United States Patent Office

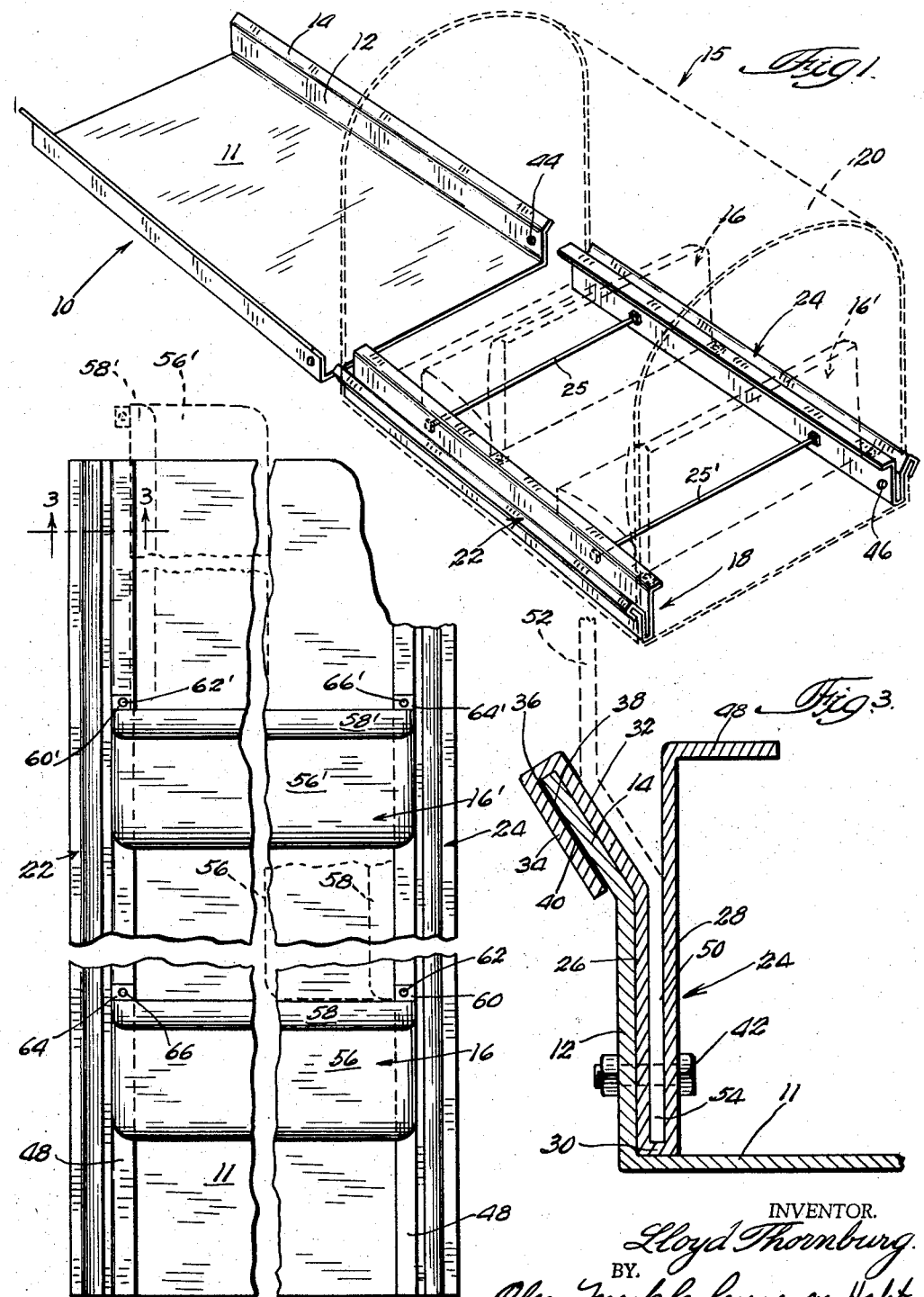

2,903,042
TRUCK SEAT ATTACHMENT
Lloyd Thornburg, Fort Madison, Iowa

Application February 8, 1957, Serial No. 639,085

5 Claims. (Cl. 155—5)

This invention relates to an attachment for a truck, and more particularly to a seat attachment which may be used to convert a truck into a bus or station wagon.

Although this attachment may be described and is particularly well adapted for use in connection with pickup trucks, it is to be understood that the invention is not limited to such uses and, in fact, may be used in connection with trucks of different design and larger dimensions.

For quite some time there has been a very great need for a device which would enable a truck to be quickly and easily converted into a comfortable means for the transportation of persons and more particularly for an attachment which would enable the conversion of a pickup truck into a station wagon and vice versa. This need has been particularly felt in the rural areas where there is an urgent requirement for the general hauling services of pickup trucks and an almost as urgent requirement for the services of passenger vehicles for the transporting of groups of persons over great distances in these rural areas. The cabs of most trucks will, of course, comfortably seat only one or at the most two persons other than the driver.

With the high costs involved in purchasing and maintaining more than one vehicle and with the understandable desire of most persons to transport their families in comfortable vehicles, the need for a device which would permit one of these vehicles to serve a dual function has been greatly felt. This is particularly true with large families where even the seating capacity of a standard passenger car is often inadequate. Such a device must, for obvious and practical reasons, be easily and quickly attachable to and disengageable from the body of the truck and must be of simple design so that its cost will be within reason. A device of this nature would enable the conversion of a pickup truck into a station wagon and would permit the increase in travel for many persons whose families could normally only afford the purchase and maintenance of a single vehicle.

It is therefore one particular object of this invention to provide an attachment for a truck which would convert the rear portion of that truck into a comfortable means of transportation for persons.

It is another object of this invention to provide an attachment for a truck which is simple to install and to remove and which requires a minimum of anchoring bolts, and the like.

It is still another object of this invention to provide a seat attachment for a truck in which the seats are readily accessible from the rear of the truck.

It is a further object of this invention to provide an attachment for a truck which will enable the rear of the truck to be used for the transportation of persons and which will enable a weather-tight enclosure to be maintained.

It is still a further object of this invention to provide a seat attachment for a truck which is of simple construction, relatively inexpensive, yet very sturdy.

It is another object of this invention to provide a seat attachment for a truck, the seats of which may be converted into a bed.

Other objects may be seen and a fuller understanding of the invention may be had by referring to the following description and claims, taken in conjunction with the accompanying drawings.

According to one embodiment of this invention an attachment is provided for a truck which has relatively shallow side panels. This attachment includes a pair of substantially parallel supporting frame members to which are attached inverted channel sections. These channel sections are adapted to receivingly engage the upper edges of the side panels of the truck when the attachment is slid into position on the truck. Portions of the two supporting frame members extend downwardly and are adapted to engage and be supported by the truck bed. At least one seat is provided. This seat is pivotally mounted on one of the supporting frame members and is adapted to be pivoted horizontally into and out of engagement with the other supporting member. A locking means is provided for maintaining this seat in the proper engaged position between the two supporting frame members.

It is preferred that the supporting frame members have inwardly extending portions on which the seat or seats may be pivotally mounted. It is also preferred that a substantially deep panel be formed in each frame member between those portions to which the inverted channel section is attached and those portions of the frame member which carry the inwardly extending portions on which the seat is attached. This channel serves an extremely useful purpose in that it permits the attachment of a cover and cooperates with this cover to form an interfitting weather-tight seal, thereby substantially increasing the usefulness of the attachment as a means for conveying persons even in extreme weather.

Referring to the drawings:

Figure 1 is a perspective view of an attachment constructed in accordance with applicant's invention showing a portion of a truck on which this attachment may be mounted;

Fig. 2 is a plan view of the attachment after it has been mounted on the truck; and Fig. 3 is a sectional elevation taken substantially on line 3—3 of Fig. 2.

With more particular reference to the drawings, a rear portion of a truck 10 is provided which includes a relatively flat horizontally disposed bed 11 and side panels 12 extending upwardly therefrom. Side panels 12 are relatively shallow and have their upper portions 14 diverging outwardly. Such a construction is well known, being typical of the construction used in presently designed pickup trucks.

In Fig. 1 a covered seat attachment 15 is shown which is adapted to be attached to truck 10 and includes seats 16, a supporting frame 18 and a cover 20. In the illustrated embodiment seats 16 are pivotally mounted on the supporting frame 18, and incorporated in supporting frame 18 is a means for attaching this frame to truck 10. Thus, supporting frame 18 includes two parallel substantially channel-shaped frame members 22 and 24, which may be spaced apart by means of support bars 25 and 25'. As best shown in Fig. 3, each of the supporting frame members 22 and 24 includes an exterior section 26, an interior section 28, and an intermediate bottom section 30. Exterior section 26 extends upwardly and has an upper portion 32 which diverges outwardly preferably in substantial conformity with the outwardly diverging upper portion 14 of truck side panel 12. The edge portions 34 of exterior section 26 are bent downwardly and inwardly such that they are in substantial underlying relationship with respect to upper portion 32 of the exterior section and thus form channel 36. Channel 36 is of such dimensions that it is adapted to receive side panel upper portion 14 and permit this portion of the side panel to frictionally slide therein.

With the construction of the frame members 22 and 24, as described, it may be seen that when the channel 36 is aligned with side panel upper portion 14 and covered seat attachment 15 is slid into position on truck 10, very little additional anchoring is necessary to maintain the attachment in place. Vertical movement of the attachment is prevented by the engagement of undersurface 38 of side panel upper portion 14 with obliquely disposed channel-defining surface 40 of frame member edge portion 34.

Supporting frame 18 may be held in position by means of a bolt or pin 42 (Fig. 3) which may be inserted through holes 44 and 46 (Fig. 1) in the side panels 12 and frame members 22 and 24, respectively, when the frame is attached to truck 10 as previously described, and these holes are brought into alignment. Of course, various other equally simple means for maintaining the frames in position will be obvious to a person skilled in the art. It is evident, however, that with applicant's novel construction the means for maintaining the attachment 15 in position may be greatly simplified, and the installation and removal of this attachment, therefore, greatly facilitated.

Interior section 28 of frame members 22 and 24 extends upwardly, and is preferably disposed parallel to the lower portions of exterior section 26. Interior portion 28 is joined to exterior portion 26 by means of intermediate bottom section 30. It is preferred that bottom section 30 rest upon and thus be supported by those portions of truck bed 11 adjacent side panels 12.

The parallel disposition of exterior section 26 and interior section 28 provides a substantially deep channel 50 therebetween. A cover 20 may be provided, the longitudinal edge portions 54 of which may extend into channel 50, thereby providing a very tight seal which is capable of resisting even the most severe weather and thus insuring the comfort of those persons riding within.

The exact design of cover 20 is not a part of this invention. However, it is preferred that the cover be constructed of relatively permanent materials such as molded plastic or sheet metal and that several roll-down windows be provided for additional passenger comfort. Access doors may be provided in the rear wall of cover 20 and if desired a front door may be added to give even greater access to the front seat 16. Exterior trim and streamlining as well as interior design are purely matters of choice although it is of course preferred that they harmonize with the interior and exterior designs of the truck on which the attachment is to be mounted.

Interior portion 28 preferably carries an inwardly extending element 48 which, in this instance, is a lateral flange. Seats 16 and 16' are pivotally mounted on these inwardly extending portions or flanges 48. In the preferred embodiment exterior section 26, interior section 28, and intermediate bottom section 30 are integral. Thus frame members 22 and 24 may be formed in a simple stamping operation from a heavy gauge sheet metal. No elaborate machining or assembling operations are required and therefore the manufacturing costs are very low. Yet the construction of these frames yields a rigid anchoring and attaching means, a sturdy mounting means for the seats, and a very effective weather seal.

Front and rear seats 16 and 16' each have a seat portion 56, 56', and back portions 58, 58'. Extending outwardly from the base of seats 16 and 16' are flanges 60, 60'. These flanges are pivotally mounted on the inwardly extending portions or flanges 48 of the frame interior sections 28 by means of pins 62, 62'. As may be seen in Fig. 2, seat 16 is mounted on flange 48 of frame member 24; whereas seat 16' is pivotally mounted on flange 48 of frame member 22. The seats are adapted to pivot rearwardly out of engagement with and forwardly into engagement with the oppositely disposed frame member. As may be seen in Fig. 2, this arrangement results in seat 16 being pivoted clockwise out of engagement with frame member 22 and seat 16' being pivoted counterclockwise out of engagement with frame member 24, thus giving access to the forward areas of the truck bed 11 when the attachment is in position on the truck. This horizontally pivotal seat arrangement not only is very effective and in fact gives greater access to the forward areas of the truck bed but also is much less costly than other types of seating arrangements, thus permitting the cost of the attachment to be maintained within reason.

It may be desirable, in certain instances, to provide some means of support which would be attached to and extend downwardly from the under parts of seat portions 56, 56' to engage truck bed 11. In this way no excessive strain would be transmitted to flange 60, 60' or pin 62, 62' should a weight be placed upon the seat 56, 56' when seats 16, 16' are out of engagement with frame members 22 and 24, respectively.

A means may be provided for locking seat 16, 16' in engagement with frame members 24 and 22, respectively. Such a locking means may include an outwardly extending flange 64, 64' and a removable pin 66, 66'. With such an arrangement it is evident that the seats 16 and 16' not only may be locked in position when in engagement between frame members 22 and 24, but also these seats may be pivoted on either of these frame members by simply removing or raising the desired pin 62, 62' or 66, 66' which connects the particular seat to the other frame member. Thus constructed the seats are very adaptable and in fact may be easily removed from the supporting frame by removing both pins.

It is preferred that the backs 58, 58' of the seats be removable and that the spaces between these seats be such that these backs may be placed horizontally between frame members 22 and 24 in such arrangements that they form a bed. It is contemplated that back 58 would be placed in front of seat 16, and back 58 would be placed between seats 16 and 16', thereby forming a continuous surface, all portions of which lie generally in the same plane. With this arrangement the attachment is quite adapted for use in overnight traveling, camping expeditions, vacations and the like.

In operation, the upper portions 14 of the truck side panels 12 are aligned with channels 36 formed in frame members 22 and 24. The frame 18 is then telescopically slid over the side panels of the truck, until the frame members 22 and 24 are in substantially coextensive overlying relationship with respect to these side panels and holes 44 and 46 are aligned. Bolt 42 may then be inserted to maintain the attachment in position. The forward area of truck bed 11 is made accessible by removing pin 66' and pivoting seat 16' in a counterclockwise direction. Pin 66 may then be removed and seat 16 pivoted in a clockwise direction, thereby permitting persons to enter the front seat. The seats may then be pivoted back into position and their locking pins 66 and 66' reinserted.

Thus it may be seen that applicant has invented a very novel and useful attachment for a truck which is very sturdy, yet inexpensive to manufacture and which may be quickly and easily mounted on a truck to convert that truck into a station wagon or bus capable of transporting a large group of persons in comfort.

Although the invention has been described with a certain degree of particularity, it is understood that the present disclosure has been made only by way of example and that numerous changes in the details of construction and the combination and arrangement of parts may be resorted to without departing from the spirit and scope of the invention, as hereinafter claimed.

What is claimed is:

1. A seat attachment for a truck having an open bed and relatively shallow side panels the upper portions of which diverge outwardly, said attachment comprising a pair of substantially parallel frame members, at least one seat pivotally mounted on one of said frame members and adapted to be pivoted into contact with the other of said frame members, means for locking said seat in engagement with the other of said frame members, said frame members each including a first portion which is adapted to engage and be supported by the truck bed and which extends upwardly and diverges outwardly in substantial conformity with the upper portions of said truck side panel, and a second portion which is bent downwardly and inwardly under the upper extremities of said first portion thereby forming a channel which is adapted to slidably receive the upper edges of said truck side panel.

2. A seat attachment for a truck having an open bed and relatively shallow side panels extending upwardly therefrom, said attachment comprising a pair of substantially parallel supporting frame members having attached thereto inverted channel sections which are adapted to receivingly engage the upper edges of the side panels of the truck, portions of said frame members extending downwardly and adapted to engage and be supported by the truck bed, a first seat pivotally mounted on one frame member and adapted to be pivoted horizontally into and out of engagement with the other supporting member, a second seat pivotally mounted on said other frame member and adapted to be pivoted into and out of engagement with said one frame member, means for locking each of said seats in position between said frame members.

3. A seat attachment for a truck having an open bed and relatively shallow side panels, the upper edges of which diverge outwardly, said attachment comprising a pair of substantially parallel supporting frame members each being substantially U-shaped and including an exterior section, an interior section, and an intermediate section, said exterior section extending upwardly and having upper portions which diverge outwardly and edge portions which are bent downwardly and inwardly to form a channel which is adapted to slidably and receivingly engage at least the edges of the side panel upper portions, said interior section extending upwardly and having portions which extend inwardly, said intermediate section adapted to rest upon and be supported by those portions of the truck bed immediately adjacent the side panels, at least one seat pivotally mounted on the inwardly extending portions of the interior section of one supporting frame member and adapted to be pivoted into and out of engagement with the other frame member, means for locking said seat in engagement with said other member.

4. An attachment for a truck having an open bed and relatively shallow side panels the upper edges of which diverge outwardly, said attachment comprising a pair of substantially parallel supporting frame members each being substantially U-shaped and including an exterior section, an interior section, and an intermediate section, said exterior section extending upwardly and having upper portions which diverge outwardly and edge portions which are bent downwardly and inwardly to form a channel which is adapted to slidably and receivingly engage at least the edges of the side panel upper portions, said interior section extending upwardly and having portions which extend inwardly, said intermediate section adapted to rest upon and be supported by those portions of the truck bed immediately adjacent the side panels, means for maintaining said frame members in spaced apart relation whereby they may be aligned with and telescopically slid over the truck side panels.

5. A seat attachment for a truck having an open bed and relatively shallow side panels extending upwardly therefrom, said attachment comprising a pair of substantially parallel supporting frame members, means for attaching said frame members to the truck, a first seat pivotally mounted on one frame member and adapted to be pivoted horizontally into and out of engagement with the other supporting member, a second seat pivotally mounted on said other frame member and adapted to be pivoted into and out of engagement with said one frame member, means for locking each of said seats in position between said frame members.

References Cited in the file of this patent

UNITED STATES PATENTS

| Number | Name | Date |
| --- | --- | --- |
| 439,325 | Oliver | Oct. 28, 1890 |
| 484,414 | Fawcett | Oct. 18, 1892 |
| 864,235 | Ellsworth | Aug. 27, 1907 |
| 983,273 | Gammon | Feb. 7, 1911 |
| 1,161,051 | Hill | Nov. 23, 1915 |
| 1,216,730 | Quiggle | Feb. 20, 1917 |
| 1,275,825 | Allen | Aug. 13, 1918 |
| 1,436,275 | MacLardy | Nov. 21, 1922 |
| 1,538,384 | Crockett et al. | May 19, 1925 |
| 2,535,242 | Stuart | Dec. 26, 1950 |
| 2,559,029 | Randolph | July 3, 1951 |
| 2,568,832 | Stone | Sept. 25, 1951 |
| 2,690,351 | Giles | Sept. 28, 1954 |

FOREIGN PATENTS

| Number | Country | Date |
| --- | --- | --- |
| 323,261 | France | Mar. 2, 1903 |